(12) United States Patent
Thonnelier et al.

(10) Patent No.: US 6,423,658 B1
(45) Date of Patent: Jul. 23, 2002

(54) ADSORBENT WITH A HIGH MACROPOROSITY, USABLE IN A GAS ADSORPTION PROCESS, ESPECIALLY A PSA PROCESS

(75) Inventors: Jean-Yves Thonnelier, Voisins le Bretonneux; Bernard Lledos, Guyancourt; Jacques Labasque, Versailles; Frédéric Crayssac, Meudon la Foret, all of (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/547,997

(22) Filed: Apr. 12, 2000

(30) Foreign Application Priority Data

Apr. 29, 1999 (FR) .............................. 99 05465

(51) Int. Cl.⁷ .................. B01J 29/06; B01J 29/072; B01J 20/04; B01J 20/06; B01J 20/18
(52) U.S. Cl. .................. 502/64; 502/400; 502/407; 502/414; 502/66; 502/74
(58) Field of Search .............. 502/60, 64, 79, 502/400, 66, 74, 407, 414

(56) References Cited

U.S. PATENT DOCUMENTS

| | | | | |
|---|---|---|---|---|
| 4,751,211 A | | 6/1988 | Fleming | |
| 5,569,634 A | * | 10/1996 | Miller et al. | 210/616 |
| 5,935,898 A | * | 8/1999 | Trubenbach et al. | 502/150 |
| 6,171,370 B1 | * | 1/2001 | Hirano et al. | 502/79 |
| 6,183,539 B1 | * | 2/2001 | Rode et al. | 502/79 |

FOREIGN PATENT DOCUMENTS

| | | |
|---|---|---|
| EP | 0 289 448 | 11/1988 |
| EP | 0 785 020 | 7/1997 |
| EP | 0 940 174 | 9/1999 |
| FR | 2 756 196 | 5/1998 |

* cited by examiner

*Primary Examiner*—Steven P. Griffin
*Assistant Examiner*—Christina Ildebrando
(74) *Attorney, Agent, or Firm*—Young & Thompson

(57) ABSTRACT

A macroporous adsorbent comprising pores having a pore volume ($V_m$) and a mean pore diameter ($d_m$) such that: $V_m \geq 1$ cc.g$^{-1}$ and $d_m \geq 1$ μm, $V_m$ and $d_m$ being determined by mercury porosimetry; their manufacturing process using a spheronization and freeze-drying technique; and their use for separating or purifying gases, such as air, synthesis gases or hydrocarbons, especially olefins.

19 Claims, No Drawings

ADSORBENT WITH A HIGH MACROPOROSITY, USABLE IN A GAS ADSORPTION PROCESS, ESPECIALLY A PSA PROCESS

FIELD OF THE INVENTION

The invention relates to a macroporous adsorbent, to a process for manufacturing such an adsorbent and to its use for implementing gas separation or purification processes using adsorption, especially PSA, TSA or VSA processes.

BACKGROUND OF THE INVENTION

Cyclic adsorption processes of the PSA (Pressure Swing Adsorption), TSA (Temperature Swing Adsorption) and VSA (Vacuum Swing Adsorption) type are widely used at the present time for the production of gases. Thus, mention may be made, for example, of the separation of gases from air by preferential adsorption of nitrogen so as to produce oxygen using the PSA or VSA process.

To do this, zeolites, especially of the LTA or FAU type, essentially X or LSX zeolites, are the adsorbents most commonly used in adsorption processes.

Conventionally, the preferred adsorbents for the separation of gases, and more particularly of air, are highly exchanged zeolites, generally exchanged to more than 80%, with alkali or alkaline-earth metals, such as lithium, calcium, strontium and barium, or transition metals, such as aluminium, copper or zinc, or mixtures of these cations.

By way of example, mention may be made of documents U.S. Pat. No. 5,268,023, U.S. Pat. No. 5,174,979, U.S. Pat. No. 4,859,217, U.S. Pat. No. 5,152,813, U.S. Pat. No. 4,481,018, U.S. Pat. No. 5,419,891, EP-A-589406 and EP-A-598391.

Such zeolites are usually synthesized in the form of a powder of micron-sized crystals. However, this pulverulent form cannot be used directly in cyclic gas separation processes or in catalytic processes, since the powder would be entrained by the pressurized gas streams.

Consequently, a forming technique, for example bead formation or extrusion, is required.

For these granulates, the size and form most suited to the process in which they have to be employed are chosen.

In particular, this forming gives the adsorbent its mechanical properties, such as compression strength, and its kinetic properties.

At the present time, no general behavioural law can be established, knowing that it is very difficult to link the parameters of the process to the parameters of the adsorbent. Nevertheless, it is known that the properties of the adsorbent, and especially those linked to its forming, play a paramount role in the overall effectiveness of the processes.

The adsorbents or granulates for separating gases generally consist of a mixture of a zeolitic active phase and an inorganic binder, such as a clay of the bentonite, attapulgite or kaolin type, ensuring mechanical cohesion of the granulates.

One example of manufacture generally used consists in preparing an intimate mixture of a zeolite and a pulverulent binder, to which mixture are added water and, if necessary, organic agents such as, for example, pore formers, fluidizers, plasticizers or any agent that modifies the rheology of the fluid, particularly its viscosity.

The mixture is subsequently formed into rods or strands of various shapes by passing it through a die or an extruder, or formed into beads using a suitable device.

Next, the granulates thus formed are fired at temperatures between 400 and 900° C., in fixed-bed or fluidized-bed furnaces, in a gas stream or under vacuum. A judicious choice of the temperature at every moment in this firing step should allow the integrity of the active zeolitic phase to be preserved.

Other processes for manufacturing granulates from solutions containing at least one dry extract exist.

Mention may be made, for example, of document DE-A-4,118,752 which relates to a process for manufacturing granulates, especially $AL_2O_3$, $ZrO_2$ and other ceramics, from a mother liquor. In this process, the mother liquor is sprayed and frozen in a cryogenic fluid so as to obtain granulates of 0.04 to 0.4 mm which are then freeze-dried.

Mention may also be made for example of documents FR-A-2,290,246, U.S. Pat. No. 3,862,302, FR-A-1,464,730, U.S. Pat. No. 3,776,988, CH-A-544,083, DE-A-4,420,936 and GB-A-2,092,880 which adopt this type of process.

Now, the productivity of gas separation units using PSA, VSA or TSA cyclic processes is a paramount factor directly related to the production cost of the gases.

One way of increasing this productivity consists in reducing the cycle time so as to produce more gas over a given period.

To do this, it is absolutely essential to use an adsorbent having sufficiently rapid adsorption kinetics, as described in document EP-A-785,020.

One known means of accelerating the mass-transfer kinetics within an adsorbent consists in reducing the hydraulic radius.

However, this approach has several drawbacks, especially that of resulting, if the gas stream is maintained, in a reduction in the permeability, resulting in an increase in head losses within the beds of adsorbents.

SUMMARY OF THE INVENTION

The problem which arises is therefore that of developing a novel adsorbent which has faster adsorption kinetics than those of known adsorbents but which results in little or no increase in head losses within adsorbent beds containing such an adsorbent, so as to improve the productivity of units for separating or purifying gases, particularly air.

Furthermore, another object of the invention is also to propose, on the one hand, a method of preparing such an adsorbent and, on the other hand, adsorption processes capable of employing such an adsorbent.

It therefore follows that the present invention relates to the production of adsorbents with a high macroporosity and to their use for the separation of gases by adsorption, and more particularly gases from air.

The term <<macroporosity>> should be understood to mean, in accordance with the IUPAC data, a pore having a diameter greater than 100 Å.

More specifically, the present invention relates to a macroporous adsorbent comprising pores having a pore volume ($V_m$) and a mean pore diameter ($d_m$) such that: $V_m \geq 1$ cc.g$^{-1}$ and $d_m \geq 1$ µm, $V_m$ and $d_m$ being determined by mercury porosimetry.

This is because it has been discovered that, surprisingly and unpredictably, such macroporous adsorbents have very rapid adsorption kinetics.

Consequently, the use of these adsorbents in processes for separating gases, especially the gases in air, make it possible to obtain production cycles of very short duration and, consequently, high productivities.

Depending on the case, the macroporous adsorbent of the invention may comprise one or more of the following characteristics:

- $d_m$ is between 1 μm and 10 μm, preferably $d_m$ is between 1 μm and 8 μm and even more preferably $d_m > 1.6$ μm.
- $V_m$ is between 1 cc.g$^{-1}$ and 10 cc.g$^{-1}$, preferably $V_m$ is between 1 cc.g$^{-1}$ and 5 cc.g$^{-1}$;
- $d_m$ is preferably between 1.7 μm and 10 μm, preferably $d^m$ is between 1.9 μm and 9 μm;
- $V_m$ is preferably between 1.1 cc.g$^{-1}$ and 10 cc.g$^{-1}$ and preferably $V^m$ is between 1.2 cc.g$^{-1}$ and 10 cc.g$^{-1}$;
- it comprises an adsorbent active phase and, if necessary, at least one inert binder;
- the adsorbent active phase is of the zeolitic type;
- the inert binder is chosen from clays, silicas, aluminas, silicates, aluminosilicates and other binders;
- the ratio of the proportion by weight of adsorbent active phase to the proportion by weight of inert binder is 50/50 to 95/5, preferably from 70/30 to 90/10;
- the adsorbent active phase contains one or more metal cations, preferably alkali metal, alkaline-earth metal or transition metal cations;
- the adsorbent zeolite phase is exchanged to at least 80% with one or more metal cations, preferably to at least 90%;
- the metal cation is chosen from lithium, calcium, zinc, iron, or any other cation of Groups 1, 2, 7, 10, 11, 12 and f of the Periodic Table of Elements as adopted by IUPAC and preferably the cation is lithium.

Moreover, the invention also relates to a process for manufacturing a macroporous adsorbent according to the invention, in which the adsorbent is manufactured by a spheronization process comprising the steps of:

(a) preparing a mother liquor by mixing at least one dry extract with at least one diluent, the said dry extract containing at least one adsorbent material;

(b) fractionating at least some of the said mother liquor into particles;

(c) freezing at least some of the particles fractionated in step (b) by bringing them into contact with at least one cryogenic fluid at a temperature below −100° C.;

(d) removing at least some of the diluent contained in the frozen particles coming from step (c); and (e) firing at least some of the particles coming from step (d) at a temperature between 300° C. and 900° C.

Depending on the case, the manufacturing process may comprise one or more of the following characteristics:

- the dry extract contains at least one zeolitic-type adsorbent and at least one binder;
- the diluent is water;
- in step (b), the fractionation is obtained by passing the mother liquor through one or more orifices of controlled size, preferably so as to obtain calibrated cylinders or beads;
- in step (c), the cryogenic fluid is liquid nitrogen;
- in step (d), the diluent removal is carried out by freeze drying;
- in step (e), the firing is carried out at a temperature between 550° C. and 750° C.;
- prior to step (b), a fluidizer or plasticizer is added to the mother liquor so as to modify the rheology, in particular the viscosity, of the said mother liquor and to facilitate its fractionation during step (b).

The macroporous adsorbents according to the invention are particularly well suited to use for the purpose of adsorbing at least one gaseous compound contained in a gas mixture.

In addition, the invention also relates to a process for separating or purifying a gas mixture employing at least one step of adsorbing at least one compound present in the said gas mixture, the adsorption of the said at least one compound being carried out by means of an adsorbent according to the invention.

Depending on the case, the separation or purification process according to the invention may comprise one or more of the following characteristics:

- the gas mixture to be purified or separated is chosen from:
  - air,
  - mixtures containing oxygen and nitrogen,
  - mixtures containing carbon monoxide and hydrogen,
  - hydrocarbons, especially olefins;
- it is of the PSA or TSA, preferably VSA, type and the gas mixture is air and the gaseous compound to be separated is oxygen.

DETAILED DESCRIPTION OF THE INVENTION

The invention will now be more clearly understood by virtue of the examples given below by way of illustration but implying no limitation.

EXAMPLE 1

Preparation of Specimen No. 1

A 13X zeolite (181.2 g) and an attapulgite-type clayey binder (45.4 g) are mixed in the solid phase.

Next, the mixture obtained is poured into 533.5 g of water, vigorously stirred and maintained at a temperature of about 3 to 8° C.

In other words, a mixture of at least one dry extract, that is to say a solid substance, in our case a 13X zeolite, and an inorganic binder, of the mineral clay type for example, and a diluent, for example water, is firstly prepared.

Optionally, organic molecules may be added to this mixture, for example fluidizing agents allowing the viscosity of the fluid to be adjusted.

Next, the mixture thus cooled is fractionated by passing it through a hollow needle having an internal diameter of 0.7 mm and a length of 12 mm, so as to form drops.

That is to say, more generally speaking, the mixture is fractionated by passing it through calibrated or uncalibrated orifices which may, if necessary, be mounted on a vibrating pot so as to form granulates of more or less spherical shape. The amplitude and frequency of the vibrations, which are judiciously chosen, make it possible to adjust the diameter of the granulates obtained. Any other type of fractionation of a relatively viscous fluid may also be used.

The granulates thus formed are brought into contact with a cryogenic fluid, the boiling point of which is below −30° C., for example liquid nitrogen, which instantly freezes the granulates, which are then recovered.

This is because the granulates or drops which fall onto a film of liquid nitrogen are instantly frozen.

The beads thus formed are recovered on a sieve and then freeze-dried using a freeze-drying apparatus, for example of the Usifroid MH15 type.

It is desirable in fact for the diluent contained in the granulates to be removed by a technique suitable for the said granulates. For this purpose, the technique of freeze drying is very suitable.

After freeze drying, the granulates thus <<dried>> are then fired at temperatures between 300 and 900° C. so as to ensure cohesion of the adsorbent. The structure of this active zeolitic phase is preserved by suitable choice of the temperature ramps and plateaux.

In this Example 1, after freeze drying, the beads are placed in a quartz reactor flushed with a stream of nitrogen. The temperature of the assembly is raised to 700° C. at 2° C./minute and maintained at this temperature for 2 hours.

The beads of macroporous adsorbent thus produced are recovered and constitute specimen No. 1 analysed below (see Example 5).

EXAMPLE 2

Preparation of Specimen No. 2

A mixture containing 96 g of 13X zeolite, 17 g of attapulgite binder and 150 g of water is prepared according to the conditions described in Example 1.

The mixture then passes through a needle having an internal diameter of 2 mm and falls onto a film of liquid nitrogen. The beads thus obtained undergo the same treatment as that described above in the case of Example 1.

The beads of macroporous adsorbent thus produced are recovered and constitute specimen No. 2 analysed below (see Example 5).

EXAMPLE 3

Preparation of Specimen No. 3

A mixture containing 80 g of 13X zeolite, 20 g of attapulgite binder and 150 g of water is prepared according to the conditions described in Example 1.

This mixture is then treated according to the conditions described in Example 2.

The beads of macroporous adsorbent thus produced are recovered and constitute specimen No. 3 analysed below (see Example 5).

EXAMPLE 4

Preparation of Specimens No. 4 and 5

For the purpose of comparison, beads of adsorbent are prepared according to a conventional method well known to those skilled in the art, using a mixture containing approximately 84% 13X zeolite and 16% binder.

These beads are fired in a stream of air at approximately 600–700° C.

These beads are then screened.

The 1.0 to 1.5 mm fraction corresponds to specimen 4 and the 1.5 to 2.0 mm fraction corresponds to specimen 5.

EXAMPLE 5

Analysis of the Results

Specimens 1 to 5 obtained above are characterized by mercury porosimetry. The mean diameters and the adsorption kinetics are measured by the OPSD and BTC tests, respectively, these being described below.

The OPSD (the Optical Particle Size Distribution) test makes it possible to determine the particle size distribution of granulates, (essentially beads) of adsorbent by a measurement based on image analysis, such as that described by the NF X11-696 standard. The adsorbent to be analysed is illuminated in transmission and an image is taken by means of a video camera. This image is digitized and analysed using specific software. (Microvision®). The software was prestandardized using perfectly calibrated steel balls. The mean diameter, expressed in mm, is thus determined with an accuracy of ±3.5%.

The BTC test employs an apparatus intended for measuring a characteristic convection-diffusion time of nitrogen in a formed adsorbent (bead, extrudate, etc.).

The adsorbent specimen is placed in a cell thermostatted at 20° C., in which a vacuum is created, and then it is brought into contact with a fixed amount of nitrogen (in mol), itself at 20° C.

The variation in pressure in the cell P=f(t) is recorded until the establishment of mechanical equilibrium (a few seconds) and thermal equilibrium (a few minutes).

The pressure signal is then interpreted using a model similar to that described in <<*Principles of adsorption and adsorption processes*>>, by D. M. RUTHVEN, John Wiley & Sons, 1984, p. 170.

The kinetic parameter $D_{eff}/R^2$ is obtained by fitting the theoretical curve corresponding to this model to the measured curve.

The results obtained are given in the table below.

TABLE

| SPECIMEN No. | MACRO-POROSITY (Hg) | | KINETICS $D_{eff}/R^2$ (1/s) | DIAMETER (mm) | INTRINSIC KINETICS ($mm^2 \cdot s^{-1}$) |
|---|---|---|---|---|---|
| | $V_m$ (cc/g) | $d_m$ (µm) | | | |
| 1 | 1.64 | 3.61 | 5.3 | 1.48 | 12 |
| 2 | 1.39 | 2.10 | 1.89 | 2.50 | 11.8 |
| 3 | 1.47 | 2.10 | 1.26 | 2.54 | 8.2 |
| 4 | 0.29 | 0.31 | 0.83 | 1.42 | 1.7 |
| 5 | 0.28 | 0.23 | 0.50 | 1.81 | 1.7 |

It should be pointed out that the <<intrinsic kinetics ($mm^2.s^{-1}$)>> parameter is obtained by multiplying the kinetic coefficient $D_{eff}/R^2$ (1/s) by the square of the diameter (mm).

Furthermore:

$D_{eff}/R^2$ : kinetic coefficient (in 1/s);

$D_{eff}$: effective diffusion-convection coefficient (in $m^2/s$);

R: characteristic radius of the particle (in m).

From the table it may be seen that the adsorbents having the highest macroporous volumes and highest mean macropore diameters (specimens 1 to 3 according to the invention) have much more rapid adsorption kinetics than the <<conventional>> adsorbents of low macroporosity (specimens 4 to 5 according to the prior art)

What is claimed is:

1. Macroporous adsorbent comprising pores having a pore volume ($V_m$) and a mean pore diameter ($d_m$) such that: $V_m \geq 1$ cc.g$^{-1}$ and $d_m \geq 1$ µm, $V_m$ and $d_m$ being determined by mercury porosimetry, said adsorbent further comprising an adsorbent active phase containing at least one metal cation selected from the group consisting of lithium, calcium, zinc and iron.

2. The adsorbent according to claim 1, wherein $d_m$ is between 1 µm and 10 µm.

3. The adsorbent according to claim 2, wherein $d_m$ is between 1.6 µm and 8 µm.

4. The adsorbent according to claim 1, wherein $V_m$ is between 1 cc.g$^{-1}$ and 10 cc.g$^{-1}$.

5. The adsorbent according to claim 4, wherein $V_m$ is between 1 cc.g$^{-1}$ and 5 cc.g$^{-1}$.

6. The adsorbent according to claim 1, further comprising at least one inert binder.

7. The adsorbent according to claim 6, wherein the adsorbent active phase is zeolitic and the inert binder is selected from the group consisting of clays, silicas, aluminas, silicates and aluminosilicates.

8. The adsorbent according to claim 7, wherein the zeolitic adsorbent active phase is exchanged to at least 80% with one or more of said metal cations.

9. The adsorbent according to claim 7, wherein the zeolitic adsorbent active phase is exchanged to at least 90% with one or more of said metal cations.

10. The adsorbent according to claim 6, wherein the adsorbent ha s a ratio of proportion by weight of adsorbent active phase to proportion by weight of inert binder ranging from 50/50 to 95/5.

11. The adsorbent according to claim 10, wherein the ratio ranges from 70/30 to 90/10.

12. The adsorbent according to claim 1, wherein the metal cation is lithium.

13. Process for manufacturing a macroporous adsorbent comprising pores having a pore volume ($V_m$) and a mean pore diameter ($d_m$) such that: $V_m \geq 1$ cc.g$^{-1}$ and $d_m \geq 1$ μm, $V_m$ and $d_m$ being determined by mercury porosimetry, said adsorbent further comprising an adsorbent active phase containing at least one metal cation selected from the group consisting of lithium, calcium, zinc and iron, the process comprising the steps of:

(a) preparing a mother liquor by mixing at least one dry extract with at least one diluent, said dry extract containing at least one adsorbent material;

(b) fractionating at least some of the mother liquor into particles;

(c) freezing at least some of the particles fractionated in step (b) by bringing them into contact with at least one cryogenic fluid at a temperature below −100° C.;

(d) removing at least some of the diluent contained in the frozen particles coming from step (c); and (e) firing at least some of the particles coming from step (d) at a temperature between 300° C. and 900° C.

14. The process according to claim 13, wherein the dry extract contains at least one zeolitic adsorbent phase and at least one binder, and the diluent is water.

15. The process according to claim 13, wherein the fractionation in step (b) is obtained by passing the mother liquor through one or more orifices of controlled size, so as to obtain calibrated cylinders.

16. The process according to claim 13, wherein the cryogenic fluid in step (c) is liquid nitrogen.

17. The process according to claim 13, wherein the diluent removal in step (d) is carried out by freeze drying.

18. The process according to claim 13, wherein the firing in step (e) is carried out at a temperature between 550° C. and 750° C.

19. The process according to claim 13, wherein prior to step (b), a fluidizer is added to the mother liquor so as to modify the viscosity of said mother liquor and to facilitate its fractionation during step (b).

* * * * *